(12) United States Patent
Quast et al.

(10) Patent No.: US 11,110,614 B2
(45) Date of Patent: Sep. 7, 2021

(54) GRIPPING DEVICE HAVING A BERNOULLI GRIPPING UNIT AND A VACUUM GRIPPING UNIT

(71) Applicant: Broetje-Automation GmbH, Rastede (DE)

(72) Inventors: Sascha Quast, Oldenburg (DE); Raphael Reinhold, Wittmund (DE)

(73) Assignee: Broetje-Automation GmbH, Rastede (DE)

( * ) Notice: Subject to any disclaimer, the term of this patent is extended or adjusted under 35 U.S.C. 154(b) by 256 days.

(21) Appl. No.: 16/337,762

(22) PCT Filed: Aug. 29, 2017

(86) PCT No.: PCT/EP2017/071632
§ 371 (c)(1),
(2) Date: Mar. 28, 2019

(87) PCT Pub. No.: WO2018/059857
PCT Pub. Date: Apr. 5, 2018

(65) Prior Publication Data
US 2019/0240847 A1    Aug. 8, 2019

(30) Foreign Application Priority Data

Sep. 28, 2016    (DE) ..................... 10 2016 011 616.1

(51) Int. Cl.
*B25J 15/06* (2006.01)
*B65G 47/91* (2006.01)

(52) U.S. Cl.
CPC .......... *B25J 15/0616* (2013.01); *B65G 47/91* (2013.01); *B65G 47/911* (2013.01)

(58) Field of Classification Search
CPC ..... B25J 15/0616; B65G 47/911; B65G 47/91
See application file for complete search history.

(56) References Cited

U.S. PATENT DOCUMENTS

| 4,566,726 A | 1/1986 | Correnti et al. |
| 4,735,449 A | 4/1988 | Kuma |

(Continued)

FOREIGN PATENT DOCUMENTS

| CH | 706362 | 10/2013 |
| EP | 1473764 | 3/2004 |

(Continued)

OTHER PUBLICATIONS

International Preliminary Report on Patentability for PCT Application No. PCT/EP2017/071632 dated Apr. 11, 2019 (7 pages). English Translation.

(Continued)

*Primary Examiner* — Stephen A Vu
(74) *Attorney, Agent, or Firm* — Pauly, DeVries Smith & Deffner LLC

(57) ABSTRACT

The disclosure relates to a gripping device for an end effector of a manipulator for holding a workpiece via its workpiece surface, having a Bernoulli gripping unit, with an outflow unit for discharging a flow from the Bernoulli gripping unit between gripping device and workpiece surface in such a manner that in a region—Bernoulli-negative pressure region—a static negative pressure for holding the workpiece is generatable by the flow, and having a vacuum gripping unit with a suction chamber, wherein in a region delimited by the suction chamber—vacuum negative pressure region—a static negative pressure for holding the workpiece is generatable, wherein the Bernoulli negative pressure region and the vacuum negative pressure region intersect at least in part or wherein the Bernoulli negative pressure region and the vacuum negative pressure region surround one another.

21 Claims, 5 Drawing Sheets

(56) References Cited

U.S. PATENT DOCUMENTS

| | | | | |
|---|---|---|---|---|
| 8,025,277 | B2* | 9/2011 | Lin | B25J 15/0052 |
| | | | | 269/55 |
| 8,684,418 | B2* | 4/2014 | Lin | B25J 15/0061 |
| | | | | 285/147.1 |
| 9,108,319 | B2* | 8/2015 | Kniss | B25J 15/0616 |
| 9,365,366 | B2* | 6/2016 | Girtman | B25B 11/007 |
| 9,415,520 | B2* | 8/2016 | Sanders | B25J 17/0275 |
| 2004/0094979 | A1* | 5/2004 | Damhuis | B25J 15/0052 |
| | | | | 294/65 |
| 2010/0296903 | A1 | 11/2010 | Shah et al. | |

FOREIGN PATENT DOCUMENTS

| | | |
|---|---|---|
| GB | 1130202 | 10/1968 |
| JP | S5948938 | 3/1984 |
| RU | 1776558 | 11/1992 |
| WO | 2018059857 | 4/2018 |

OTHER PUBLICATIONS

"German Search Report," for German Patent Application No. 102016011616.1 dated May 30, 2017 (6 pages), no English translation.

"International Search Report and Written Opinion," for PCT Application No. PCT/EP2017/071632 dated Dec. 1, 2017 (18 pages) with English translation.

* cited by examiner

GRIPPING DEVICE HAVING A BERNOULLI GRIPPING UNIT AND A VACUUM GRIPPING UNIT

CROSS-REFERENCE TO RELATED APPLICATIONS

This application is a national stage application under 35 U.S.C. 371 of International Patent Application Serial No. PCT/EP2017/071632, entitled "Gripping Device Having a Bernoulli Gripping Unit And A Vacuum Gripping Unit," filed Aug. 29, 2017, which claims priority from German Patent Application No. DE 10 2016 011 616.1, filed Sep. 28, 2016, the disclosure of which is incorporated herein by reference.

FIELD OF THE TECHNOLOGY

The disclosure relates to a gripping device for an end effector of a manipulator, to an end effector for a manipulator and to a manipulator.

BACKGROUND

Different types of gripping devices for end effectors of manipulators are disclosed in the prior art. Vacuum gripping devices comprise, as a rule, a suction chamber in which a static negative pressure is generated for holding the workpiece. The negative pressure can be generated according to the Venturi principle or by means of a negative pressure source. Vacuum gripping devices mostly grip the workpiece. When held, it is then not displaceable in relation to the gripping device. Bernoulli gripping devices, in contrast, generate a flow between the gripping device and the workpiece in such a manner that a negative pressure is created between the Bernoulli gripping device and the workpiece to hold the workpiece. Said negative pressure is held only as long as the flow exists, as a result of which a relatively large amount of energy is required for the holding as the flow has to be continuously sustained. In addition, Bernoulli gripping devices can hold workpieces mostly in a floating manner. The workpieces are then able to be displaced in relation to the gripping device when being held.

SUMMARY

The object underlying the disclosure is to provide a reliable, compact gripping device which can be operated cost-efficiently and is also usable flexibly for workpieces of different sizes.

The above object is achieved by a gripping device with the features described herein.

As a result of providing a Bernoulli gripping unit, which comprises an outflow unit between gripping device and workpiece surface for discharging a flow from the Bernoulli gripping unit in such a manner that a static negative pressure for holding the workpiece is generatable as a result of the flow in a region—Bernoulli negative pressure region—the workpiece is able to be held in the manner of a Bernoulli gripping unit.

As a result of providing a vacuum gripping unit, which comprises a suction chamber, wherein a static negative pressure for holding the workpiece is generatable in a region delimited by the suction chamber—vacuum negative pressure region—a workpiece is able to be held in a particularly energy-saving manner.

In order to create as compact and flexible a gripping device as possible, it is further provided according to the disclosure that the Bernoulli negative pressure region and the vacuum negative pressure region intersect at least in part or that the Bernoulli negative pressure region and the vacuum negative pressure region surround one another. As a result, differently sized workpieces are able to be handled in a particularly flexible manner. This does not namely refer here to a grid spacing between the different types of gripping devices since the gripping device as proposed combines both operating principles.

In the present case, the workpiece is gripped via its workpiece surface. The workpiece to be gripped can consist at least in part of a dimensionally stable or a of a limp material. In particular, the workpieces to be gripped can be aluminium sheets or aluminium foils and/or fibre materials, in particular fibre mats. In principle, the workpieces to be gripped can be structural components, in particular aircraft components or semi-finished parts for such structural components.

In various embodiments, it is proposed that the Bernoulli-negative pressure region is arranged fully in the vacuum negative pressure region, and/or, that the vacuum negative pressure region is arranged fully in the Bernoulli negative pressure region.

It can be that the Bernoulli gripping unit is arranged at least in part, or fully, in the vacuum gripping unit. The Bernoulli gripping unit can be arranged at least in part, or fully, in the suction chamber. This enables a particularly compact design and at the same time a large vacuum negative pressure region.

According to some embodiments, the Bernoulli gripping unit allows the workpiece to be held in a floating manner with a degree of freedom of movement of the workpiece along the workpiece surface. As a result, compensation is possible in particular when the workpiece is deformed by the end effector. The vacuum gripping unit, in contrast, allows the workpiece to be fixedly held without any degree of freedom of movement of the workpiece along the workpiece surface.

According to some embodiments, the gripping device comprises a Bernoulli operating mode in which the workpiece is held by the Bernoulli gripping unit. A vacuum operating mode in which the workpiece is held, where needed, by the vacuum gripping unit, is additionally provided. Furthermore, the gripping device can comprise, in principle, a combined operating mode in which the workpiece is held by the Bernoulli gripping unit and by the vacuum gripping unit.

Various embodiments describe advantageous structural designs of the vacuum gripping unit and of the Bernoulli gripping unit.

In some embodiments, it is proposed that the gripping device realizes a pre-mounted unit and is mountable on an end effector as a unit. As a result, it is possible to exchange the gripping device on the end effector in a particularly simple manner.

The object described in the introduction is achieved additionally by an end effector with the features as described herein.

The same advantages as already described previously in connection with the gripping device are produced. In this regard, reference can be made to the preceding statements.

The end effector comprises here at least two gripping devices. In this case, only part of the gripping device can be designed in the previously described manner. According to an alternative, all the gripping devices can also be realized in the previously described manner.

In addition, the object described in the introduction can be achieved by a manipulator with the features described herein. The manipulator is provided here with at least three axes which serve for positioning the above end effector.

The same advantages as described above in connection with the gripping device and/or in connection with the end effector are produced.

The manipulator can include a switchable valve device for the, in particular, pneumatic connection of the gripping device or of at least one of the gripping devices to an, in particular, pneumatic supply source. In this case, the supply source can be, in particular, a pressure source and/or a negative pressure source. Multiple gripping devices are connectable and/or connected to the supply source here in a group by means of the valve device.

Various embodiments provide a gripping device for an end effector of a manipulator for holding a workpiece via its workpiece surface, having a Bernoulli gripping unit, with an outflow unit for discharging a flow from the Bernoulli gripping unit between gripping device and workpiece surface in such a manner that in a region—Bernoulli-negative pressure region—a static negative pressure for holding the workpiece is generatable by the flow, and having a vacuum gripping unit with a suction chamber, wherein in a region delimited by the suction chamber—vacuum negative pressure region—a static negative pressure for holding the workpiece is generatable, wherein the Bernoulli negative pressure region and the vacuum negative pressure region intersect at least in part or wherein the Bernoulli negative pressure region and the vacuum negative pressure region surround one another.

In some embodiments, the Bernoulli-negative pressure region is arranged fully in the vacuum negative pressure region, and/or, that the vacuum negative pressure region is arranged fully in the Bernoulli negative pressure region.

In some embodiments, the Bernoulli gripping unit is arranged at least in part, or fully, in the vacuum gripping unit, such that the Bernoulli gripping unit is arranged at least in part, or fully, in the suction chamber.

In some embodiments, the Bernoulli gripping unit allows the workpiece to be held in a floating manner with movability of the workpiece along the workpiece surface, and/or, in that the vacuum gripping unit allows the workpiece to be fixedly held without movability of the workpiece along the workpiece surface.

In some embodiments, the gripping device comprises a Bernoulli operating mode in which the workpiece is held by the Bernoulli gripping unit, and/or, in that the gripping device comprises a vacuum operating mode in which the workpiece is held by the vacuum gripping unit, and/or, in that the gripping device comprises a combined operating mode in which the workpiece is held by the Bernoulli gripping unit and by the vacuum gripping unit.

In some embodiments, the suction chamber opens into a suction opening which delimits the vacuum negative pressure region.

In some embodiments, the suction chamber is formed by a bellows suction body, such as a folding bellows suction body.

In some embodiments, the vacuum gripping unit comprises a negative pressure line for applying a negative pressure to the suction chamber, and/or, in that the Bernoulli gripping unit comprises a pressure line for applying the compressed air to the outflow unit.

In some embodiments, the centre axes of the negative pressure line and of the pressure line extend coaxially at least in portions, such as the negative pressure line is received in the pressure line and/or in that the pressure line is received in the negative pressure line.

In some embodiments, the gripping device realizes a pre-mounted unit and is mountable on an end effector as a unit.

Various embodiments provide an end effector for a manipulator having at least one gripping device according to the disclosure.

In some embodiments, at least two gripping devices are provided and in that only part of the gripping devices are designed according to the disclosure, or, in that all gripping devices are realized according to the disclosure.

Various embodiments provide a manipulator, in particular a robot, having at least three axes, having an end effector according to the disclosure.

In some embodiments, the manipulator comprises a switchable valve device for the, in particular, pneumatic connection between the gripping device or of at least one of the gripping devices and an, in particular, pneumatic supply source, in particular a pressure source and/or a negative pressure source.

BRIEF DESCRIPTION OF THE DRAWINGS

The disclosure is explained in more detail below by way of one drawing which simply shows exemplary embodiments, in which.

DETAILED DESCRIPTION

Figure 1:
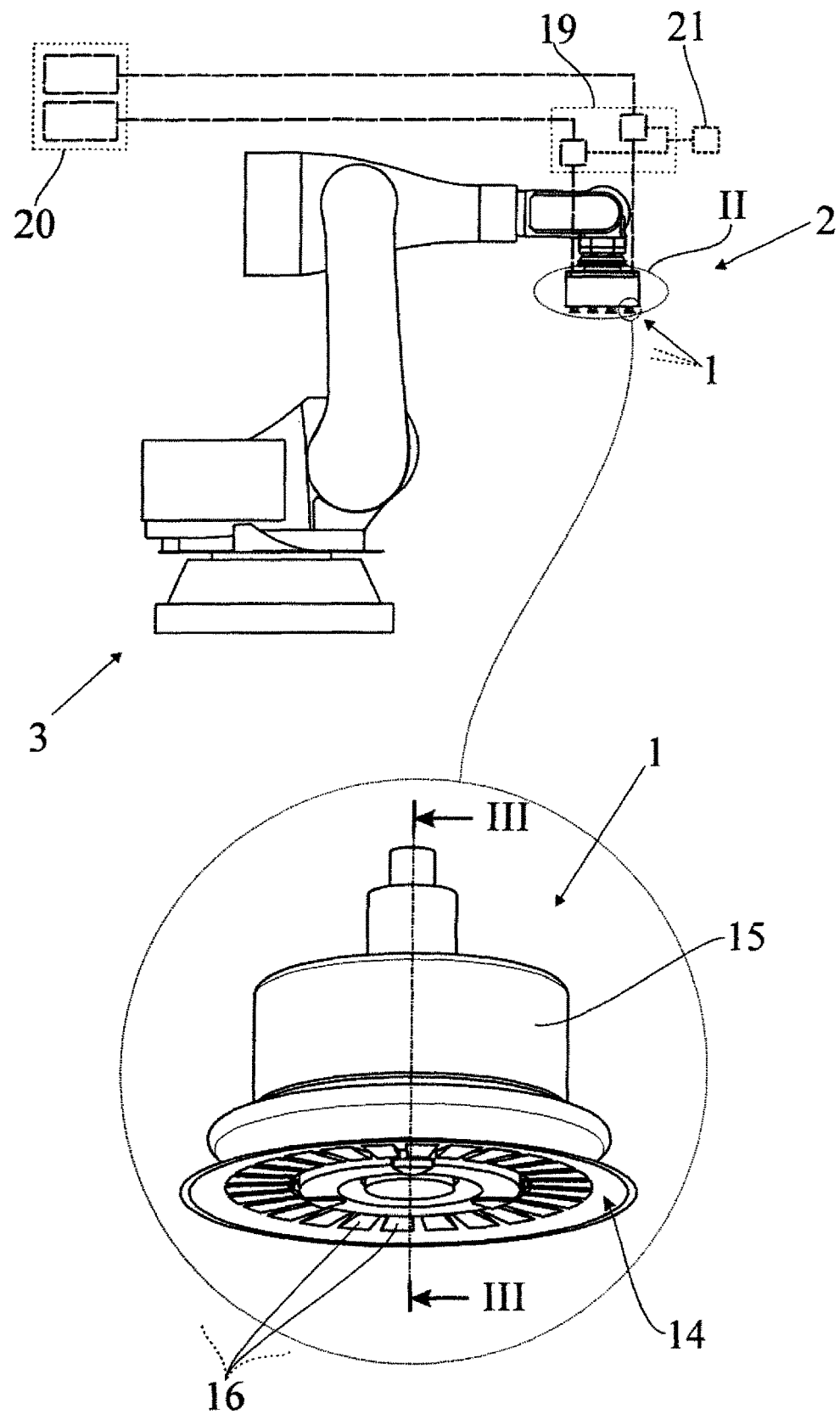
FIG. 1 shows a gripping device as proposed for an end effector as proposed on a manipulator as proposed.

FIG. 1 shows a gripping device 1 for an end effector 2 of a manipulator 3 for handling a workpiece 4 via its workpiece surface 5.

In principle, every workpiece 4, which is grippable via the workpiece surface 5 thereof by means of a static negative pressure, is able to be handled using the gripping device 1 as proposed. The workpiece 4 can be any workpiece which has a corresponding workpiece surface 5.

Dimensionally stable or also limp workpieces 4 are able to be held using the gripping device 1. Said limp materials can be, in particular, aluminium sheets or aluminium foils and/or fibre materials, in particular fibre mats. The fibre materials can be dry fibre materials and/or pre-impregnated fibre materials.

As proposed, the gripping device 1 comprises a Bernoulli gripping unit 6. The Bernoulli gripping unit 6 comprises an outflow unit 7 for discharging a flow from the Bernoulli gripping unit 6 between the gripping device 1 and the workpiece surface 5 in such a manner that in a region—Bernoulli-negative pressure region 8—a static negative pressure for holding the workpiece 4 is generatable by the flow over the workpiece surface 5. In addition to the static pressure part, the flow comprises a dynamic pressure part. Reference is made to the Bernoulli equation in this regard.

In addition, the gripping device 1 as proposed comprises a vacuum gripping unit 9. Said vacuum gripping unit includes a suction chamber 10. In a region which is delimited by the suction chamber 10—vacuum negative pressure region 11—a static negative pressure for holding the workpiece 4 is generatable by way of the suction chamber 10 via the workpiece surface 5. Substantially no flow, in some embodiments, occurs in the suction chamber 10 during holding by way of the vacuum gripping unit 9.

When using the term "vacuum", a pressure that is less than the ambient pressure is meant here. This applies, in particular, in connection with the terms "vacuum gripping unit", "vacuum negative pressure region" and "vacuum operating mode".

When the workpiece 4 is held, the suction chamber 10 forms here with the workpiece 4 substantially a closed space. As a result, a negative pressure has to be built up in the suction chamber 10 to receive a workpiece 4, which negative pressure has then simply to be maintained to hold the workpiece 4. This enables particularly low energy consumption for the holding of the workpiece 4. In this respect, the region between the workpiece 4 and the gripping device 1 is substantially flow-free when the workpiece 4 is held by way of the vacuum gripping unit 9. When the workpiece 4 is held with the vacuum gripping unit 9, consequently, as has already been explained above, a static pressure state is set substantially in the gripping device 1, in particular in the suction chamber 10.

In contrast to this, for holding the workpiece 4 by way of the Bernoulli gripping unit 6, a flow is generated continuously, at least in a part region between the gripping device 1 and the workpiece 4.

In order to create a particularly compact and flexibly usable gripping device 1 which holds the workpiece 4 in a reliable manner, the Bernoulli negative pressure region 8 and the vacuum negative pressure region 11 intersect at least in part, as shown in the drawing. As an alternative to this and not shown here, it can also be provided that the Bernoulli negative pressure region 8 and the vacuum negative pressure region 11 surround one another. In both cases, the gripping device 1 is able to be used in an extremely flexible manner for different-sized workpieces 4.

In the exemplary embodiment shown in the drawing, the Bernoulli negative pressure region 8 is arranged fully in the vacuum negative pressure region 11. As an alternative to this, however, it can also be provided that the vacuum negative pressure region 11 is arranged fully in the Bernoulli negative pressure region 8.

For the case where the Bernoulli negative pressure region 8 and the vacuum negative pressure region 11 surround one another, the Bernoulli negative pressure region 8 and the vacuum negative pressure region 11 are separated from one another. In some embodiments, the Bernoulli negative pressure region 8 and the vacuum negative pressure region 11 adjoin one another directly in this case and are separated from one another in particular by a barrier, for example by an elastic wall element.

Figure 3:
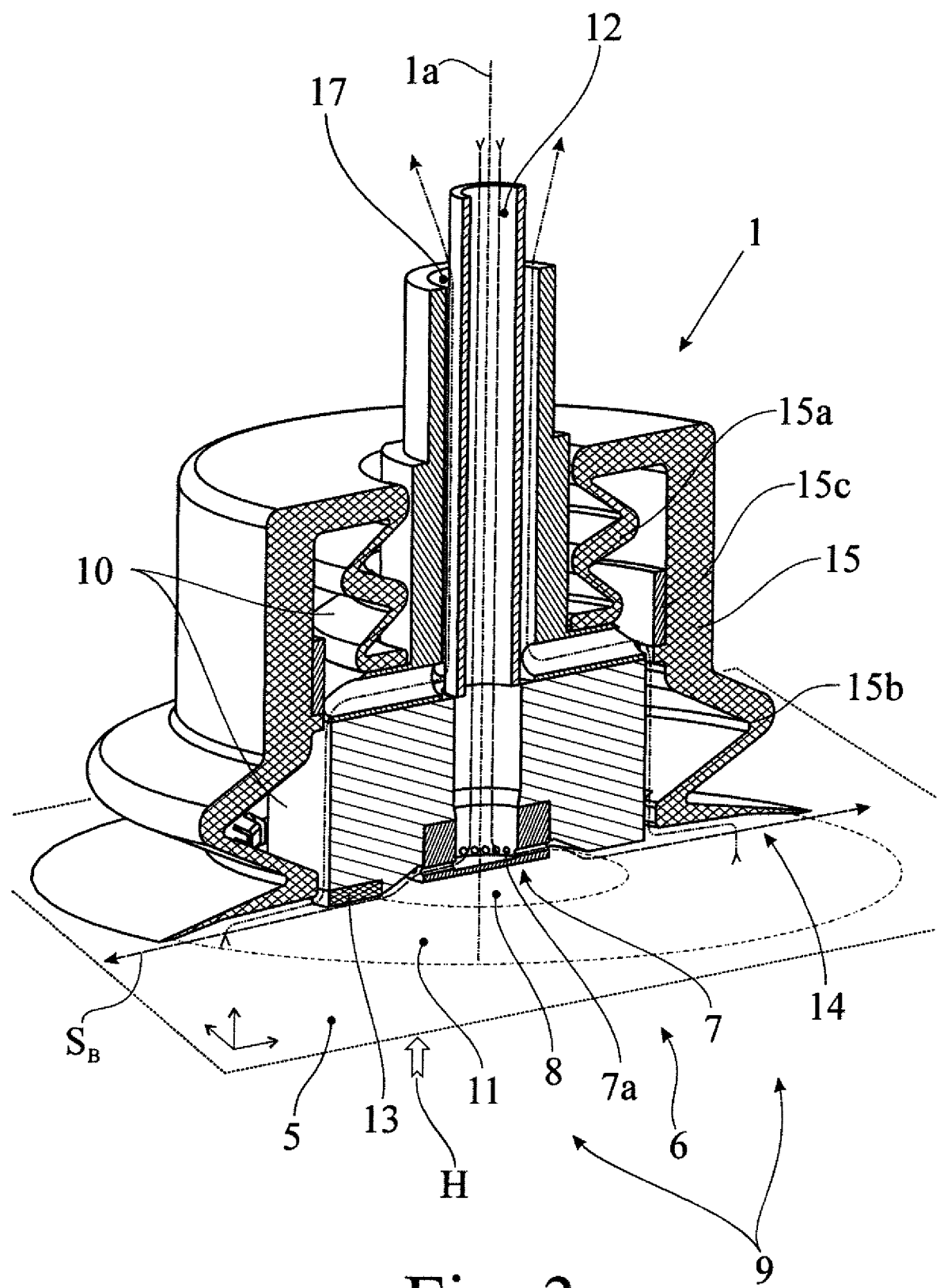
FIG. 3 shows a section through a first exemplary embodiment of a gripping device as proposed according to the view III from FIG. 1.
Figure 4:
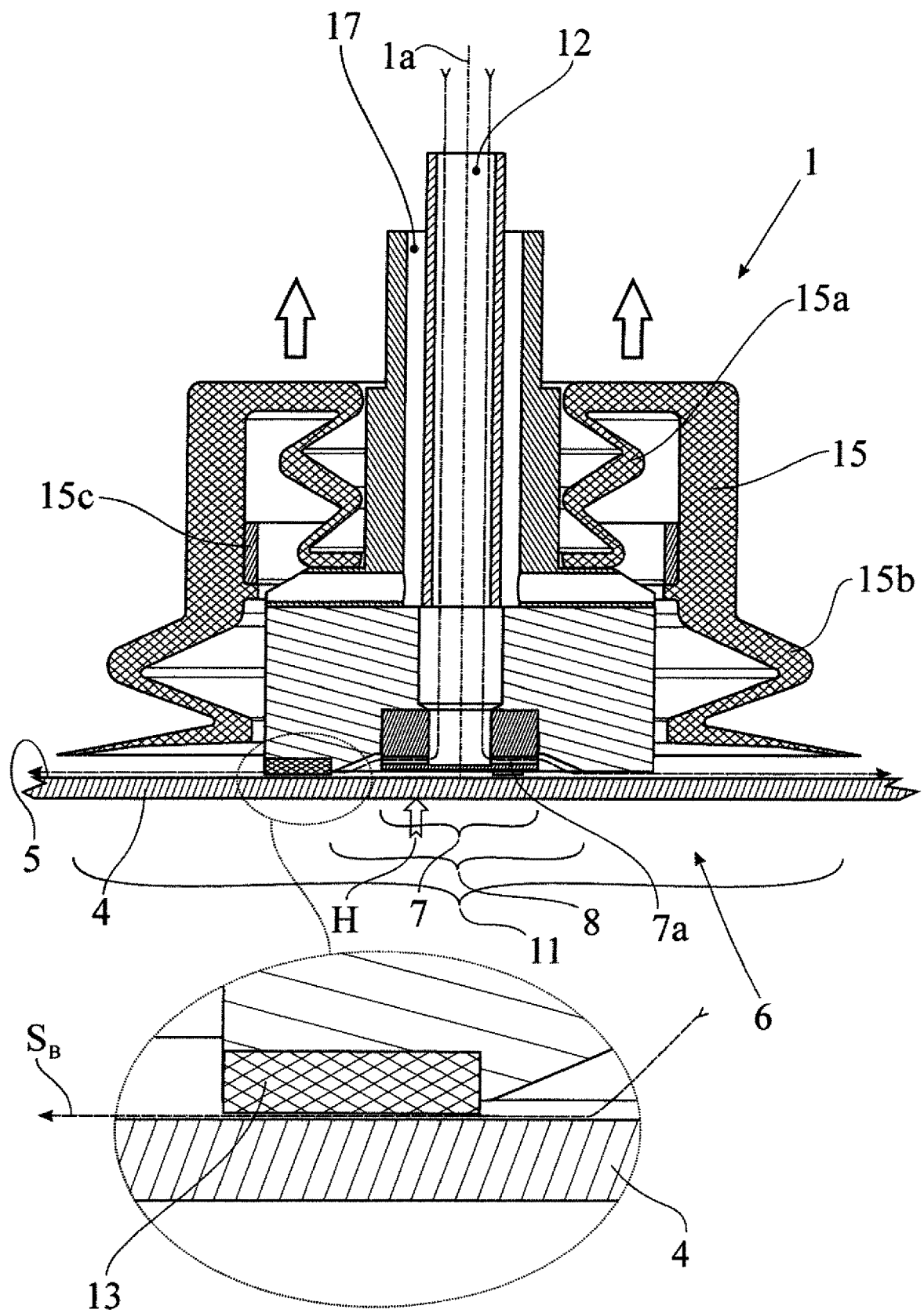
FIG. 4 shows a gripping device as proposed in the Bernoulli operating mode.
Figure 5:
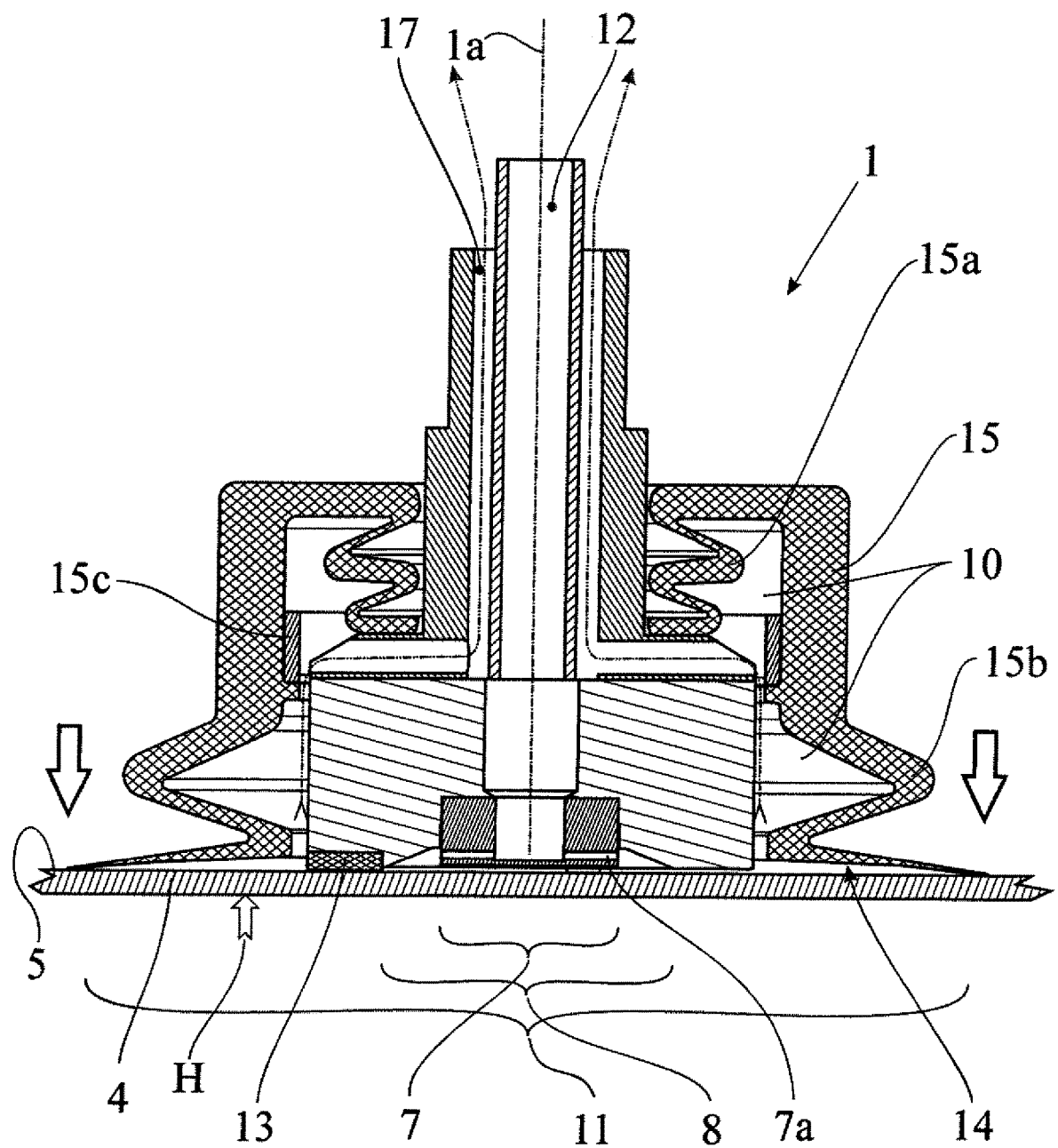
FIG. 5 shows a gripping device as proposed in the vacuum operating mode.

As shown in FIGS. 3 to 5, the Bernoulli gripping unit 6 is arranged at least in part, here fully, in the vacuum gripping unit 9. The Bernoulli gripping unit 6, in this case, can be arranged at least in part, here fully, in the suction chamber 10. In an alternative design, however, it can also be provided that the vacuum gripping unit 9 is arranged, at least in part, or fully, in the Bernoulli gripping unit 6.

The Bernoulli gripping unit 6 allows, in principle, the workpiece 4 to be held in a floating manner so that the workpiece 4 is displaceable relative to the gripping device 1 along the workpiece surface 5, in particular in an almost friction-free manner. The flow enabling the workpiece 4 to be held by the Bernoulli gripping unit 6 forms, in this case, an air cushion on which the workpiece 4 is displaceable in a corresponding manner.

The vacuum gripping unit 9, in contrast, allows the workpiece 4 to be held fixedly without any degree of freedom of movement of the workpiece 4 along the workpiece surface 5. The workpiece 4, in this case, is not displaceable in relation to the vacuum gripping unit 9. In this respect, a type of sliding bearing is generated by the Bernoulli gripping unit 6 for the workpiece 4, whilst a type of fixed bearing is formed for the workpiece 4 with the vacuum gripping unit 9.

The gripping device 1 can include a Bernoulli operating mode in which the workpiece 4 is held by the Bernoulli gripping unit 6, and/or a vacuum operating mode in which the workpiece 4 is held by the vacuum gripping unit 9. As an alternative to this or in addition to it, the gripping device 1 can comprise a combined operating mode in which the workpiece 4 is held by the Bernoulli gripping unit 6 and by the vacuum gripping unit 9. In some embodiments, it is such that the gripping device 1 holds the workpiece 4 in the Bernoulli operating mode principally, in particular exclusively, by the Bernoulli gripping unit 6 or in the vacuum operating mode principally, in particular exclusively, by the vacuum gripping unit 9.

A design which is particularly advantageous fluidically and is shown here relates to a design of the Bernoulli gripping unit 6 and/or of the vacuum gripping unit 9 which is substantially rotationally symmetrical with reference to a gripping axis 1a. In principle, however, it is also possible to deviate from said rotational symmetry.

The Bernoulli gripping unit 6 comprises a pressure line 12 for applying compressed air to the outflow unit 7. As shown in FIG. 4, the compressed air flows through the pressure line 12 into the outflow unit 7 and is discharged radially from said outflow unit with reference to the gripping axis 1a. To this end, the outflow unit 7 comprises here a plurality of openings 7a which are distributed about the gripping axis 1a. The centre axes of the openings 7a can extend substantially parallel to the surface 5 of the workpiece. As an alternative to this, they can also be inclined, however, at an angle of up to 30° in relation to the surface 5 of the workpiece. As shown in FIG. 4, an air pocket, which is formed by the flow which also generates the negative pressure for holding the workpiece 4, is formed here between the surface 5 of the workpiece and the gripping device 1, here the Bernoulli gripping unit 6. The workpiece 4 is held by the Bernoulli gripping unit 6 as indicated above in a substantially contact-free manner.

The Bernoulli gripping unit 6 comprises a row of support elements 13 only to ensure that a gap always remains between the surface 5 of the workpiece and the gripping device 1 in the Bernoulli operating mode. The workpiece 4 can consequently be held securely in the Bernoulli operating mode, even if, for example, unwanted mechanical vibrations develop on the workpiece 4.

The vacuum gripping unit 9 comprises, as addressed above, the suction chamber 10. The suction chamber 10 opens out into a suction opening 14 which is in contact with the surface 5 of the workpiece in the vacuum operating mode and delimits the vacuum negative pressure region 11. The holding force for holding the workpiece 4 is generated by the applying of a negative pressure to the suction chamber 10. To this end, said suction chamber can be connected via a negative pressure line 17 to a negative pressure source, in particular a negative pressure pump. The function of the negative pressure source can also be taken over by a Venturi arrangement so long as there is just one compressed air connection.

The suction chamber 10 can be formed by a bellows suction body 15, such as a folding bellows suction body. A reinforcing element 15c, in particular made of plastics material and/or metal, is arranged here in the bellows suction body 15. As shown in FIG. 5, said bellows suction body 15 is additionally mounted on the gripping device 1 in a resilient manner, in particular by means of its own spring portion 15a. Furthermore, the bellows suction body 15 comprises a spring portion 15b in the region of the suction opening 14 so that it can be applied resiliently to the workpiece 4.

The bellows suction body 15 can be realized in one piece, in particular integrally, as shown in FIGS. 3 to 5. In principle, a multi-part design is also possible. The bellows suction body 15 can comprise, in particular, two or three bellows suction body parts which differ from one another, where applicable, by their material characteristics.

As can be seen in FIG. 1, support portions 16 for the support of and application to the workpiece 4 are provided here in the suction opening 14. In some embodiments, said support portions are realized on the bellows suction body 15. The surface 5 of the workpiece is consequently supported in a stable manner in the vacuum operating mode.

In addition, the vacuum gripping unit 9 comprises a negative pressure line 17 for applying a negative pressure in the suction chamber 10. Here, the centre axes of the negative pressure line 17 and of the pressure line 12 extend coaxially to one another at least in portions. In some embodiments, when the negative pressure line 17 is received in the pressure line 12, and/or, when the pressure line 12 is received in the negative pressure line 17, as is shown in the exemplary embodiment. Such a realization enables an especially simple connection between the gripping device 1 and an end effector 2. As an alternative to this, however, the pressure line 12 and the negative pressure line 17 can also be realized separately from one another.

The gripping device 1 can be realized as a pre-mounted unit which is mountable on an end effector 2 as a unit. Where the negative pressure line 17 is received in the pressure line 12 or the pressure line 12 is received in the negative pressure line 17, such mounting is possible in a particularly simple manner by means of a screw connection. The gripping device 1 can be connected to the end effector 2 in a non-positive and/or positive locking manner such that simple exchange of a faulty gripping device 1 is possible.

Figure 2:
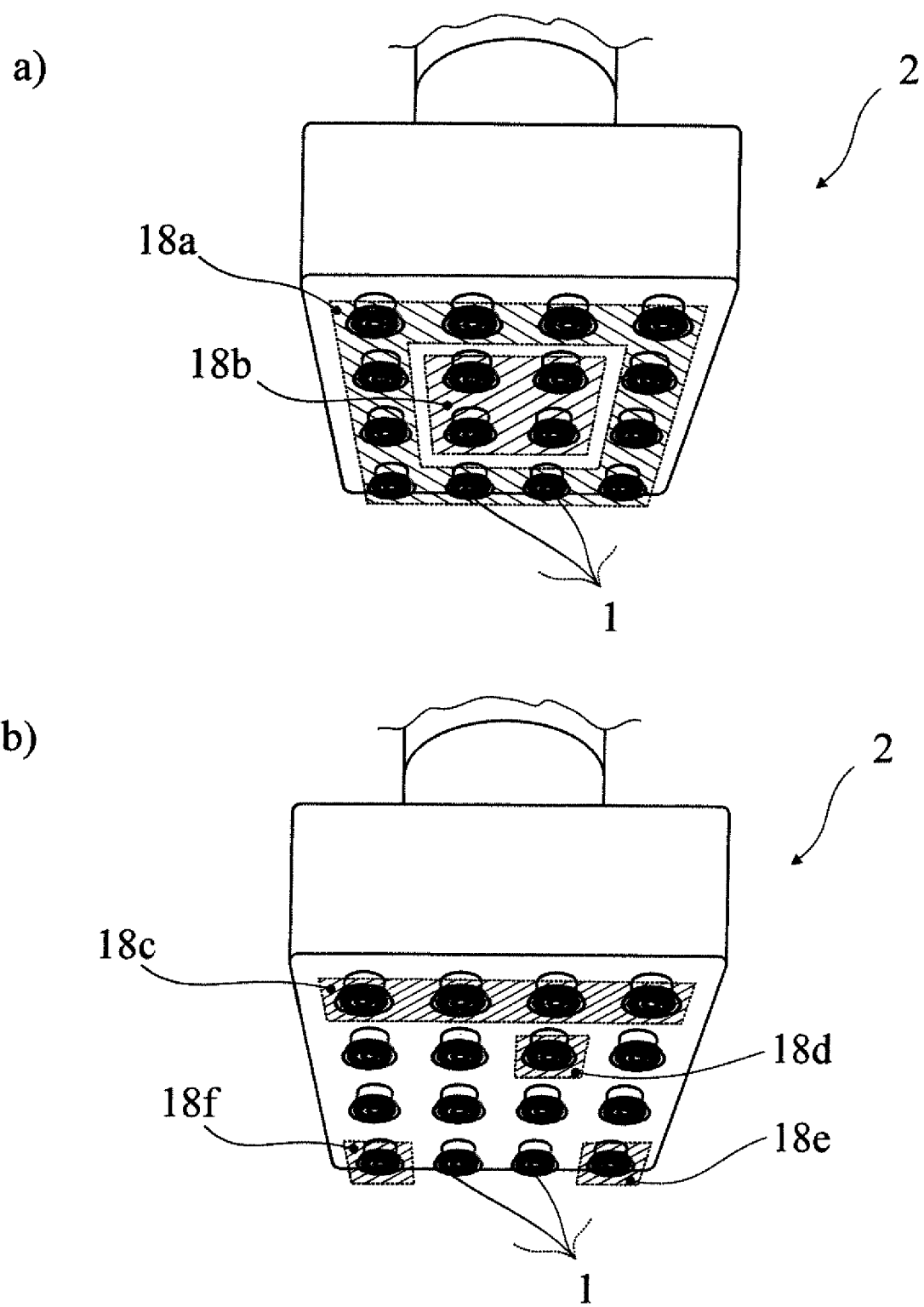
FIG. 2 shows an end effector as proposed with multiple gripping devices as proposed, the gripping devices being combined into different groups in a) and in b)

As shown in FIGS. 1 and 2, at least one gripping device 1 as proposed is provided on an end effector 2 as proposed for a manipulator 3. The end effector 2 can include at least two gripping devices 1, at least one gripping device 1 or only part of the gripping devices 1 being designed as proposed or, as in the exemplary embodiment, all gripping devices 1 being realized as proposed.

The, here, multiple gripping devices 1 together realize a gripping region, over which the respective holding force is transmissible to the surface 5 of the workpiece. Depending on the actuation of the gripping devices 1, different gripping regions can be realized from individual part gripping regions 18a-f. As an example, the different gripping regions are indicated in FIGS. 2a and 2b by hatched surfaces. FIG. 2a shows the possibility of realizing an outer part gripping region 18a and an inner part gripping region 18b. FIG. 2b shows that the part gripping regions there 18c, 18d, 18e, 18f are able to be adapted individually to a certain degree to the respective application case by the gripping devices 1 being actuated in a corresponding manner.

The manipulator 3, in particular the end effector 2, comprises here a switchable valve device 19 for the actuation of the gripping devices, that is to say for the connection of the gripping device 1 or of one of the gripping devices 1 to a supply source 20. The valve device 19 can include multiple valves. The valve device 19 has assigned thereto a corresponding electronic control unit 21.

When receiving and/or depositing a workpiece 4, the gripping device 1 or gripping devices 1 can be operated in the vacuum operating mode. Between the receiving and the depositing, one gripping device 1 or multiple gripping devices 1 can be switched over into the Bernoulli operating mode for positioning the workpiece 4 relative to the end effector 2 and/or for forming the workpiece 4 on the end effector 2. One and/or two gripping devices 1 can remain, in this case, in the vacuum operating mode, however, it is also possible for all gripping devices 1 to be switched over.

Finally, when the workpiece 4 is deposited, a compressed air impulse can be generated by means of the Bernoulli gripping units so as to release said workpiece from the end effector 2.

The invention claimed is:

1. A gripping device for an end effector of a manipulator for holding a workpiece via its workpiece surface,
    having a Bernoulli gripping unit, with an outflow unit for discharging a flow from the Bernoulli gripping unit between gripping device and workpiece surface in such a manner that in a region—Bernoulli-negative pressure region—a static negative pressure for holding the workpiece is generatable by the flow,
    and having a vacuum gripping unit with a suction chamber, wherein the suction chamber is formed by a bellows suction body, wherein in a region delimited by the suction chamber—vacuum negative pressure region—a static negative pressure for holding the workpiece is generatable, and
    wherein the Bernoulli negative pressure region and the vacuum negative pressure region intersect at least in part or wherein the Bernoulli negative pressure region and the vacuum negative pressure region surround one another.

2. The gripping device according to claim 1, wherein the Bernoulli-negative pressure region is arranged fully in the vacuum negative pressure region, and/or, that the vacuum negative pressure region is arranged fully in the Bernoulli negative pressure region.

3. The gripping device according to claim 1, wherein the Bernoulli gripping unit is arranged at least in part in the vacuum gripping unit.

4. The gripping device according to claim 3, wherein the Bernoulli gripping unit is arranged at least in part in the suction chamber.

5. The gripping device according to claim 3, wherein the Bernoulli gripping unit is arranged fully in the suction chamber.

6. The gripping device according to claim 1, wherein the Bernoulli gripping unit allows the workpiece to be held in a floating manner with movability of the workpiece along the workpiece surface, and/or, wherein the vacuum gripping unit allows the workpiece to be fixedly held without movability of the workpiece along the workpiece surface.

7. The gripping device according to claim 1, wherein the gripping device comprises a Bernoulli operating mode in which the workpiece is held by the Bernoulli gripping unit, and/or, wherein the gripping device comprises a vacuum operating mode in which the workpiece is held by the vacuum gripping unit, and/or, wherein the gripping device comprises a combined operating mode in which the workpiece is held by the Bernoulli gripping unit and by the vacuum gripping unit.

8. The gripping device according to claim 1, wherein the suction chamber opens into a suction opening which delimits the vacuum negative pressure region.

9. The gripping device according to claim 1, wherein the vacuum gripping unit comprises a negative pressure line for applying a negative pressure to the suction chamber, and/or, wherein the Bernoulli gripping unit comprises a pressure line for applying the compressed air to the outflow unit.

10. The gripping device according to claim 9, wherein the centre axes of the negative pressure line and of the pressure line extend coaxially at least in portions.

11. The gripping device according to claim 10, wherein the negative pressure line is received in the pressure line and/or in that the pressure line is received in the negative pressure line.

12. The gripping device according to claim 1, wherein the gripping device realizes a pre-mounted unit and is mountable on an end effector as a unit.

13. An end effector for a manipulator having at least one gripping device according to claim 1.

14. The end effector according to claim 13, wherein at least two gripping devices are provided.

15. A manipulator comprising: at least three axes, and an end effector according to claim 13.

16. The manipulator according to claim 15, wherein the manipulator comprises a switchable valve device for the pneumatic connection between the gripping device or of at least one of the gripping devices and an, in particular, pneumatic supply source.

17. The gripping device according to claim 1, wherein the Bernoulli gripping unit is arranged fully in the vacuum gripping unit.

18. The gripping device according to claim 1, wherein the suction chamber is formed by a folding bellows suction body.

19. A gripping device for an end effector of a manipulator for holding a workpiece via its workpiece surface,
   having a Bernoulli gripping unit, with an outflow unit for discharging a flow from the Bernoulli gripping unit between gripping device and workpiece surface in such a manner that in a region—Bernoulli-negative pressure region—a static negative pressure for holding the workpiece is generatable by the flow,
   and having a vacuum gripping unit with a suction chamber, wherein in a region delimited by the suction chamber—vacuum negative pressure region—a static negative pressure for holding the workpiece is generatable,
   wherein the Bernoulli negative pressure region and the vacuum negative pressure region intersect at least in part or wherein the Bernoulli negative pressure region and the vacuum negative pressure region surround one another, and
   wherein the gripping device realizes a pre-mounted unit and is mountable on an end effector as a unit.

20. A gripping device for an end effector of a manipulator for holding a workpiece via its workpiece surface,
   having a Bernoulli gripping unit, with an outflow unit for discharging a flow from the Bernoulli gripping unit between gripping device and workpiece surface in such a manner that in a region—Bernoulli-negative pressure region—a static negative pressure for holding the workpiece is generatable by the flow,
   and having a vacuum gripping unit with a suction chamber, wherein in a region delimited by the suction chamber—vacuum negative pressure region—a static negative pressure for holding the workpiece is generatable,
   wherein the Bernoulli negative pressure region and the vacuum negative pressure region intersect at least in part or wherein the Bernoulli negative pressure region and the vacuum negative pressure region surround one another, and
   wherein the Bernoulli gripping unit allows the workpiece to be held in a floating manner with movability of the workpiece along the workpiece surface, and/or, wherein the vacuum gripping unit allows the workpiece to be fixedly held without movability of the workpiece along the workpiece surface.

21. A manipulator comprising:
   at least three axes,
   an end effector, and
   a gripping device for the end effector of the manipulator for holding a workpiece via its workpiece surface,
      having a Bernoulli gripping unit, with an outflow unit for discharging a flow from the Bernoulli gripping unit between gripping device and workpiece surface in such a manner that in a region—Bernoulli-negative pressure region—a static negative pressure for holding the workpiece is generatable by the flow,
      and having a vacuum gripping unit with a suction chamber, wherein in a region delimited by the suction chamber—vacuum negative pressure region—a static negative pressure for holding the workpiece is generatable,
      wherein the Bernoulli negative pressure region and the vacuum negative pressure region intersect at least in part or wherein the Bernoulli negative pressure region and the vacuum negative pressure region surround one another, and
      wherein the manipulator comprises a switchable valve device for the pneumatic connection between the gripping device or of at least one of the gripping devices and an, in particular, pneumatic supply source.

* * * * *